(12) United States Patent
Boyer et al.

(10) Patent No.: US 6,351,090 B1
(45) Date of Patent: Feb. 26, 2002

(54) DEVICE FOR STARTING A GAS TURBINE IN AN AIRCRAFT

(75) Inventors: Serge Boyer, Deyme; Régine Sutra-Orus, Tournefeuille; Stéphane Tregine-Regent, Cornebarrieu; Alain Tardy, St Remy la Varenne; Claude Barbier, Angers; Philippe Buron, St.Saturnin; Patrick Ribardiere, St. Laurent de la Plaine; Marcel Louarn, Vern d'Anjou, all of (FR)

(73) Assignee: Aerospatiale Societe Nationale Industrielle and Kollmorgen Artus (FR)

( * ) Notice: Subject to any disclaimer, the term of this patent is extended or adjusted under 35 U.S.C. 154(b) by 0 days.

(21) Appl. No.: 09/175,654

(22) Filed: Oct. 20, 1998

(30) Foreign Application Priority Data

Oct. 20, 1997 (FR) .............................. 97 13107

(51) Int. Cl.[7] .................................. H02P 7/00
(52) U.S. Cl. .................. 318/139; 60/39.142; 290/38 R; 290/46; 290/10; 290/31; 290/22; 318/148
(58) Field of Search ................... 60/39.141, 39.142, 60/39.02; 318/140–158, 139; 290/7–11, 22, 31, 38 R, 46–48

(56) References Cited

U.S. PATENT DOCUMENTS

| | | | | |
|---|---|---|---|---|
| 4,456,830 A | * | 6/1984 | Cronin | 290/27 |
| 5,172,543 A | | 12/1992 | White | |
| 5,175,439 A | | 12/1992 | Harer et al. | |
| 5,493,201 A | | 2/1996 | Baker | |
| 5,495,127 A | * | 2/1996 | Aota et al. | 290/31 |
| 5,512,811 A | * | 4/1996 | Latos et al. | 318/254 |
| 5,899,411 A | * | 5/1999 | Latos et al. | 244/53 A |
| 5,966,925 A | * | 10/1999 | Torikai et al. | 60/39.06 |

* cited by examiner

*Primary Examiner*—David S. Martin
(74) *Attorney, Agent, or Firm*—Vanophem & Vanophem, P.C.

(57) ABSTRACT

A device for starting a gas turbine in an aircraft includes an electrical power supply delivering a direct current and a drive electric motor connected to the power supply, independent of the turbine to be started and having an output shaft mechanically coupled to an input shaft of the turbine to rotate with it. The drive electric motor is a three-phase alternating current synchronous motor and is controlled by an inverter connected to the power supply. Applications include situations in which the turbine to be driven is a high-power turbine.

28 Claims, 6 Drawing Sheets

DEVICE FOR STARTING A GAS TURBINE IN AN AIRCRAFT

BACKGROUND OF THE INVENTION

1. Field of the Invention

The present invention is generally concerned with devices used in aircraft to start a gas turbine.

It is more particularly concerned with the situation in which the turbine to be started is intended in particular to serve as an auxiliary electrical power unit commonly called an APU.

Even more particularly, the present invention concerns the situation in which, in the case of an aircraft APU, the turbine is a high-power turbine.

2. Description of the Prior Art

At present the turbine to be started is usually at the rear of the aircraft, to be more precise in the tail of the aircraft.

Its starting sequence entails it being driven mechanically until its speed has reached a value substantially equal to 50% of its nominal value in normal operation.

As soon as its speed thereafter reaches 95% of its nominal value the turbine is coupled to a synchronous generator which, controlled accordingly, then operates as an alternator and generates the electrical power required to supply the onboard equipment of the aircraft.

At present two different technologies are routinely used for starting a gas turbine of the above kind.

In accordance with the first, and older, of these starting technologies the starter device includes an independent drive electric motor, the output shaft of which can be mechanically coupled to the input shaft of the turbine to be started and supplied with direct current from the onboard batteries of the aircraft.

As used above, "independent" drive electric motor means an electric motor separate from the alternator that is coupled to the turbine.

In practice the batteries that power the independent drive electric motor are usually in the front of the aircraft, in the cargo hold.

The starting torque required to start a high-power turbine and the corresponding starting power are necessarily very high.

Under these conditions the starting current to be supplied to the motor can itself be very high, frequently greater than, 1,000 A, and difficult to control.

It is impossible, under these conditions, to use the batteries in the front of the aircraft, if for no other reason than the resulting heat dissipation in the electrical conductors connecting the batteries to the motor.

Batteries exclusively used to power the starter motor must be provided at the rear of the aircraft, as close as possible to the motor.

This leads to an unwanted and non-negligible increase in all up weight, in the order of 50 kg.

In the second existing starting technology, usually called the alternator-starter technology, which is currently tending to predominate because it is normally able to achieve better performance, the synchronous generator coupled to the turbine is controlled so as to operate as a motor and applies to the turbine the mechanical power needed to start it.

Because an independent starter motor is eliminated and because the electrical conductors required to connect it are also eliminated the weight and the dimensions of the system are advantageously limited.

However, the synchronous generator is specifically designed to operate normally as an alternator and does not offer good performance when operated as a starter motor.

In particular, its torque constant is low.

Starting a high-power turbine requires a high current to be passed through its armature and it is therefore necessary to control the synchronous generator using a complex and heavy converter and to provide a second converter to control it when operated as a motor, which inevitably imposes a penalty in terms of all up weight.

For high values of the starting current to be supplied the weight and size of such converters can be prohibitive in the case of an aircraft.

Finally, modern high-power turbines often have two separate shafts, one for starting them and the other for driving the synchronous generator, and the two shafts are thermodynamically coupled together in a non-reversible fashion with the result that it is not possible to operate the synchronous generator as a motor.

The present invention consists is a device for starting a gas turbine in an aircraft which, while being suitable for starting a high-power turbine without imposing any constraints on the other onboard equipment of the aircraft, avoids the drawbacks referred to above and additionally has other advantages.

SUMMARY OF THE INVENTION

The invention is a device for starting a gas turbine in an aircraft including an electrical power supply device adapted to deliver a direct current and a drive electric motor connected to the power supply device, independent of the turbine to be started and having an output shaft adapted to be mechanically coupled to an input shaft of the turbine to rotate with it, wherein the drive electric motor is a three-phase alternating current synchronous motor and is controlled by an inverter connected to the power supply device.

If the power supply device employed includes one or more storage batteries it is advantageously possible to use the storage batteries usually available at the front of the aircraft.

In accordance with the invention, all that is required is to provide, at the same location, a voltage converter adapted to raise the voltage to a value sufficient for the heat dissipation in the electrical conductors that are then inevitably used between the front part and the rear part where the turbine to be started is located to remain within acceptable limits for the same power.

The same applies if, as an alternative, the electrical power supply device employed includes the three-phase alternating current supply usually present on an aircraft.

In accordance with the invention, if the onboard three-phase alternating current supply is used, all that is required is to connect it via a current converter.

In either case, a non-negligible weight saving is obtained and it is worth emphasizing that, in accordance with the invention, this result is achieved in a someone paradoxical manner by dissociating two devices, here the independent motor used for starting and the synchronous generator used in normal operation, and thereby reverting to the technology of the independent drive electric motor, whereas in the alternator-starter technology, and in accordance with an attitude that is widespread in the aeronautical field, a weight saving is usually obtained by integrating separate devices.

Be this as it may, using an independent drive motor for starting has the advantage that the best possible use is made in service of the properties of the synchronous generator coupled to the turbine without the design of the synchronous generator needing to allow for operation in motor mode which limits the risk of failure or of degradation of performance to which any malfunction could lead during starting in motor mode.

Controlling the drive motor with an inverter, preferably using the vector control technique, has the advantage of optimum control of the supply current and therefore of the torque that it delivers so that the system can be adapted optimally to suit the parameters of the turbine, with the benefit of optimizing its operating conditions and of making the system more reliable.

In particular, the service life of the turbine is advantageously increased.

In accordance with the invention the phase shift between the current supplied to the motor and the electromotive force generated by the motor is controlled in accordance with the operating point of the motor.

This phase shift control can be independent of the vector control, but, if associated therewith, it has the advantage of optimizing the performance of the motor.

Moreover, the inverter and, in particular, the phase and/or the amplitude of its output current and therefore the drive torque supplied, can be controlled in accordance with measured instantaneous parameters of the turbine such as the exhaust gas temperature, for example, and/or in accordance with preprogrammed parameters, such as the flight phase or the outside temperature, for example.

The torque supplied by the motor can therefore advantageously be adapted to suit the needs of the moment even more closely.

In a preferred embodiment of the invention the voltage converter downstream of the electrical power supply device is made up of a plurality of individual converter modules which has the advantage of reducing the size of the system while allowing a high power to be achieved.

Also in a preferred embodiment of the invention the various converter modules employed, the inputs of which are connected in parallel, have their outputs connected in series.

The resulting reduction in their individual conversion ratio advantageously overcomes technical problems that could otherwise result from their implementation.

Further features and advantages of the invention will emerge from the following description given by way of example with reference to the accompanying diagrammatic drawings.

DETAILED DESCRIPTION OF THE PREFERRED EMBODIMENTS

Figure 1:
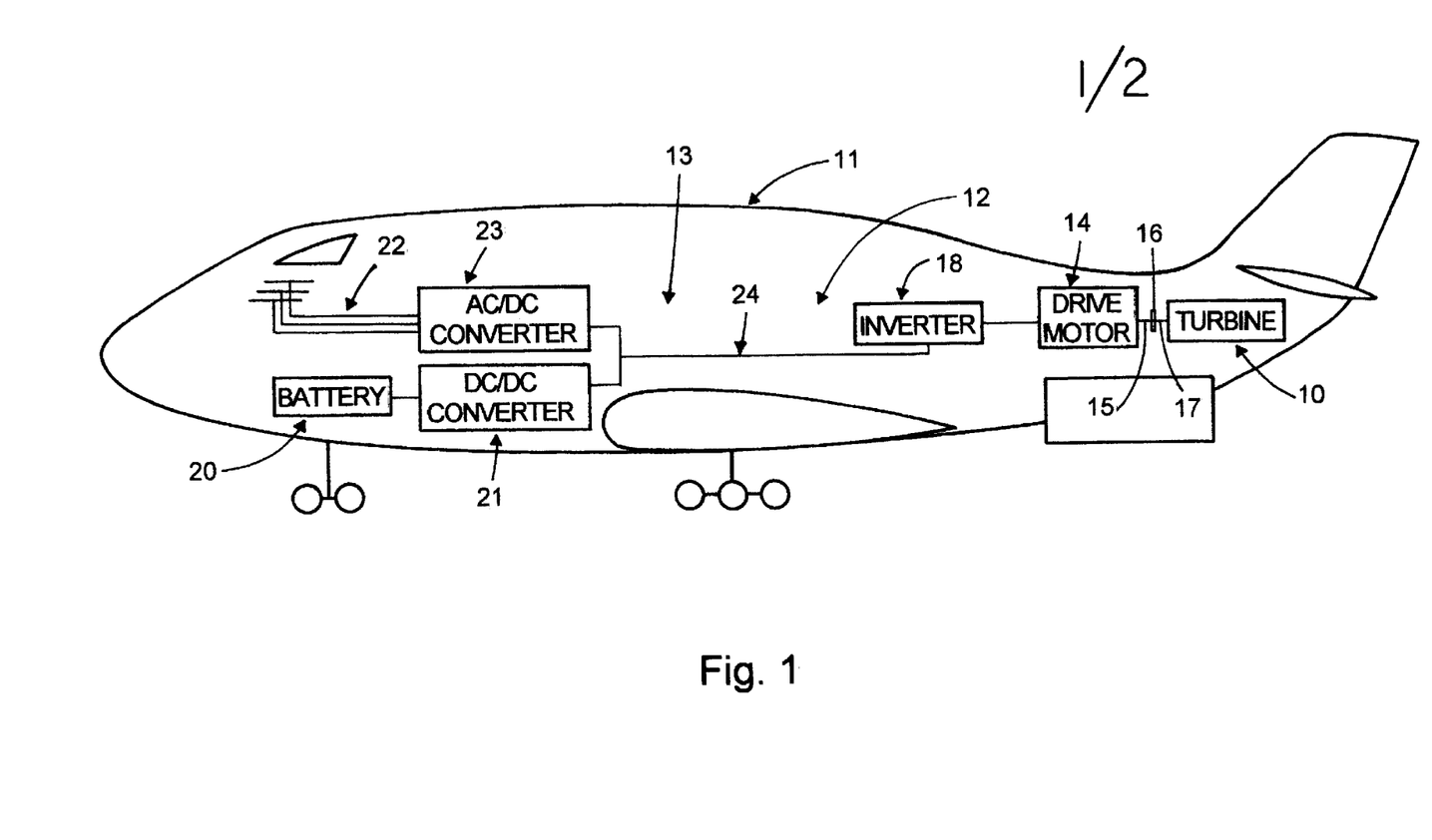
FIG. 1 is a block diagram of the starting device in accordance with the invention.

Referring to FIG. 1, the overall aim is to start a turbine 10 that is part of the onboard equipment of an aircraft 11 and which is in, practice a gas turbine.

In the embodiment shown, the turbine 10 is in the rear part of the aircraft 11, to be more precise in the tail of the aircraft.

In a manner that is known in itself the associated starting device 12 includes, as described in more detail below, an electrical power supply 13 delivering direct current and a drive electric motor 14 connected to the power supply 13, independent of the turbine 10 and the output shaft 15 of which can be mechanically coupled to the input shaft 17 of the turbine 10 to rotate therewith, for example by a clutch 16.

In accordance with the invention the drive electric motor 14, referred to for convenience simply as the motor hereinafter, is a synchronous motor supplied with three-phase alternating current and controlled by an inverter 18 connected to the power supply 13.

The power supply 13 includes at least one storage battery 20, which in accordance with the invention is followed by a DC/DC voltage converter 21.

In the embodiment shown the power supply 13 further includes, in parallel with the storage battery or batteries 20, the fixed or variable frequency three-phase alternating current supply 22 that is usually present onboard the aircraft 11. As described in more detail below, in accordance with the invention the onboard three-phase AC supply 22 is connected via an AC/DC current converter 23.

It is of course for convenience only, in order to distinguish them from each other, that the converter 21 is referred to here as a voltage converter and the converter 23 is referred to here as a current converter, the converter 21 essentially raising the voltage of a direct current and the converter 23 converting an alternating current into a direct current.

Obviously, in both cases, voltage and current are interrelated.

In the embodiment shown, the storage battery or batteries 20 is/are disposed in the front part of the aircraft 11, to be more precise in the front cargo hold of the aircraft.

Likewise the voltage converter 21 and the current converter 23 are disposed in the front part of the aircraft 11.

On the other hand, the drive electric motor 14 is in the rear part of the aircraft 11 and likewise the inverter 18 which is disposed as close as possible to the drive electric motor 14 is also disposed in the rear part of the aircraft 11.

The voltage converter 21 and the current converter 23 are therefore connected in common to the inverter 18 by electrical conductors 24 that run like a busbar the full length of the aircraft 11.

Figure 2:
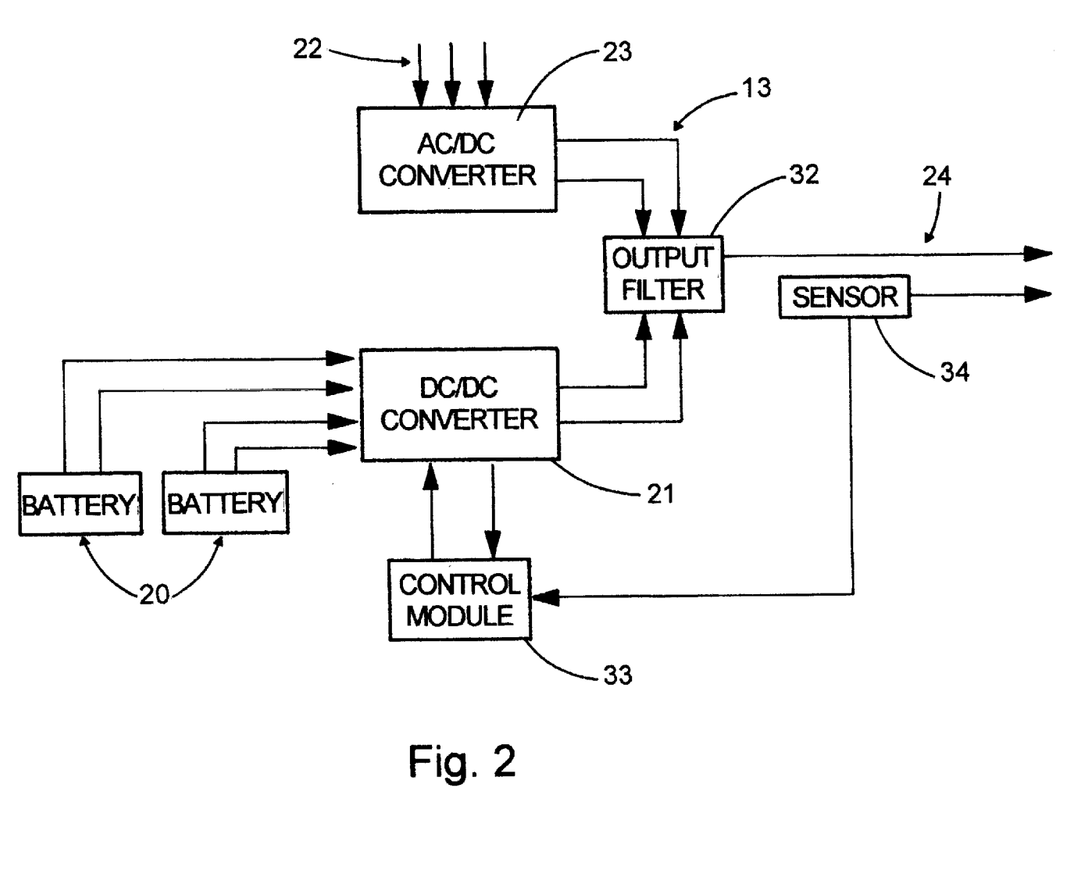
FIG. 2 is a more detailed block diagram of part of the starting device.
Figure 3:
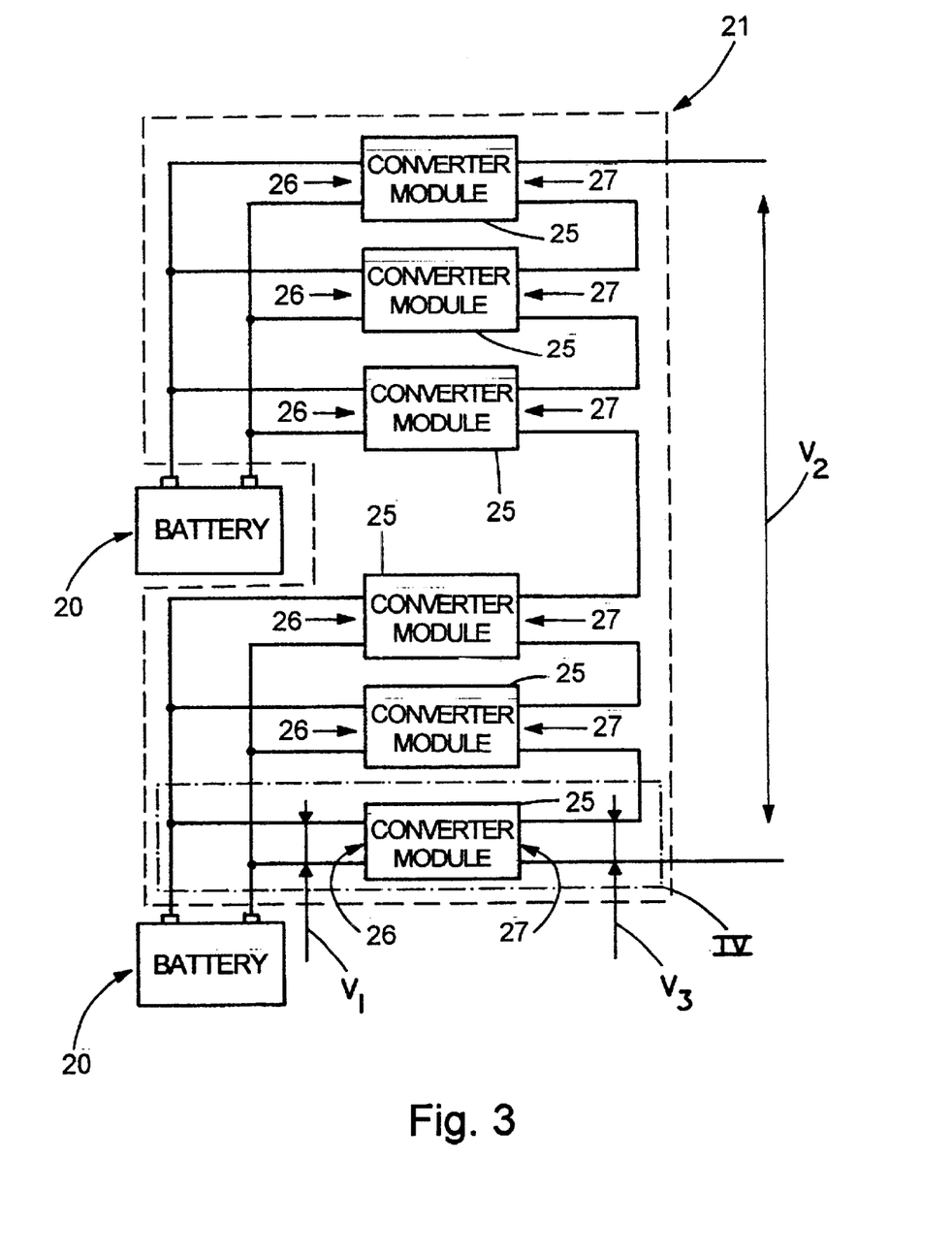
FIG. 3 is a general block diagram of its voltage converter.

To limit constraints on the other onboard equipment of the aircraft 11, and in any event to maintain such constraints within limits considered acceptable in aeronautics, two storage batteries 20 are preferably provided, as shown in FIGS. 2 and 3.

The battery voltage V1 is in the order of 28 V, for example.

In the aeronautical field this is regarded as a low voltage.

In accordance with the invention, starting from this low voltage V1, which is in any event always less than 80 V, the voltage converter 21 supplies a voltage V2 which in the aeronautical field is regarded as a high voltage, the high voltage V2 being in the range 400 V to 600 V, for example in the order of 500 V, the current being in the order of 25 A.

Because a high voltage is used, line losses by heat dissipation in the electrical conductors 24 and/or the mass of the conductors can advantageously be minimized.

The high voltage employed also enables the use of a motor with a high torque constant as the drive electric motor 14 and therefore a low current inverter as the inverter 18, optimizing the power switches that it incorporates.

In this way the inverter 18 itself can advantageously be light in weight.

In accordance with the invention, and as shown in FIG. 3, the voltage converter 21 is preferably made up of a plurality of individual converter modules 25 with their inputs 26 connected in parallel and their outputs 27 connected in series.

In this way the individual conversion ratio of each converter module 25 can advantageously be low, which facilitates their manufacture.

For example, and as shown here, six converter modules 25 are employed each supplying a DC voltage V3 in the order of 80 V and therefore advantageously having a low individual conversion ratio.

The identical converter modules 25 each supply approximately 2 kW.

They are preferably divided into groups and there is one storage battery 20 per group.

To be more precise, when two storage batteries 20 are used, as here, there are two groups of converter modules 25, one for each storage battery 20, and each group includes three converter modules 25.

Figure 4:
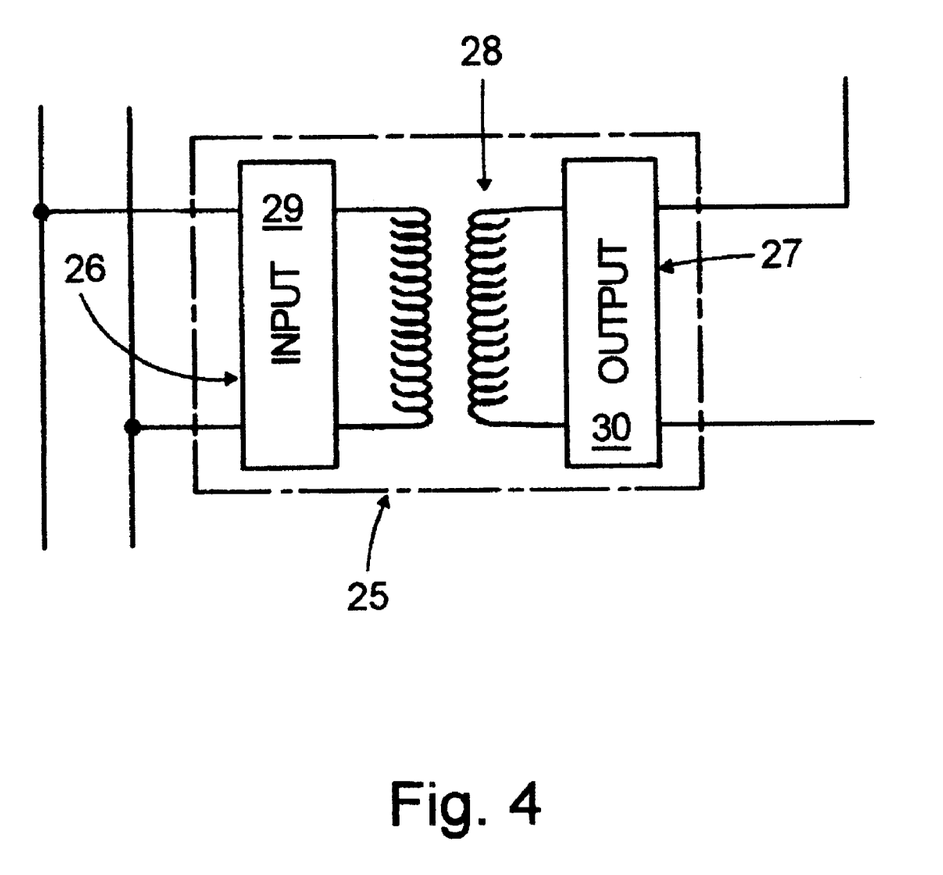
FIG. 4 is a more detailed diagram of one of the converter modules of the voltage converter shown inside the frame IV in FIG. 3.

As can be seen in the case of one of them in FIG. 4, each of the converter modules 25 preferably employs a transformer 28 which provides the required individual conversion ratio.

Each converter module 25 therefore includes, on the input side of the transformer 28, a DC/AC converter 29 to convert a direct current into an alternating current and, on the output side of the transformer 28, an AC/DC converter 30 to convert an alternating current into a direct current.

Apart from providing the required increase in voltage, the transformer 28 advantageously provides galvanic isolation between the inputs 26 and the outputs 27 of the converter modules 25.

The operating frequency of the transformer 28 is preferably high to minimize the individual weight of each converter module 25 and to minimize losses.

In practice, the operating frequence is in the range 25 kHz to 100 kHz, preferably being in the order of 40 kHz.

Using a technology that is known in itself, the transformer 28 of the converter modules 25 is preferably a planar transformer.

In other words, it is preferably a flat transformer made up of flat conductors in the form of copper plates or printed circuits surrounded with ferrite.

The leakage inductance, weight and overall size of a transformer of the above kind are advantageously low.

Also in a manner that is known in itself, each converter module 25 uses power switching devices.

The power switching devices are preferably of the MOSFET type as these are well suited to operation at high frequencies and low voltages.

Also in the usual manner, the voltage converter 21 formed by the various converter modules 25 is associated with an input filter, not shown in the figures, and with an output filter 32 (see FIG. 2) which in, practice is on the upstream side of the electrical conductors 24.

As shown in FIG. 2, the voltage converter 21 is preferably also subject to the action of a current-sensitive control module 33.

As shown in FIG. 2, for example, it is possible for this purpose to connect a sensor 34 to the output inductor in series with one of the electrical conductors 24.

For ease of implementation, however, the control module 33 is preferably sensitive to the peak value of the current flowing in the secondary of the transformer 28 of a converter module 25.

Using a technology that is known in itself, the current converter 23 through which the onboard three-phase alternating current supply 22 is connected is preferably in the form of a transformer followed by two diode bridges, not shown in the figures.

As shown in FIG. 2, the output filter 32 associated with the voltage converter 21 is preferably also associated with the current converter 23 on the upstream side of the electrical conductors 24.

The inverter 18 employed in accordance with the invention is in practice a forced switching three-phase high-voltage inverter.

It is constructed from standard power components used to the maximum of their capacity.

These components include power switching devices, in the usual way.

These power switching devices are preferably of the IGBT type with a fast free-wheel diode, which advantageously, has a high voltage/current rating.

Like the inverter 18, the drive electric motor 14 is made up of standard components used to the maximum of their capacity.

It is in practice a permanent magnet synchronous motor.

To be more precise, it is a carbon hooped and glued samarium cobalt permanent magnet motor with three pole pairs and a star wound stator.

Using a synchronous motor in this way instead of a direct current motor has the advantage of low weight and system reliability is improved through the absence of brushes.

The wiring for supplying it with power at the high voltage is also advantageously low in weight.

In practice, and other things being equal, the weight of the drive electric motor 14 is less than half that of a direct current motor and the weight of the wiring is reduced by a factor of almost 20.

Figure 5:
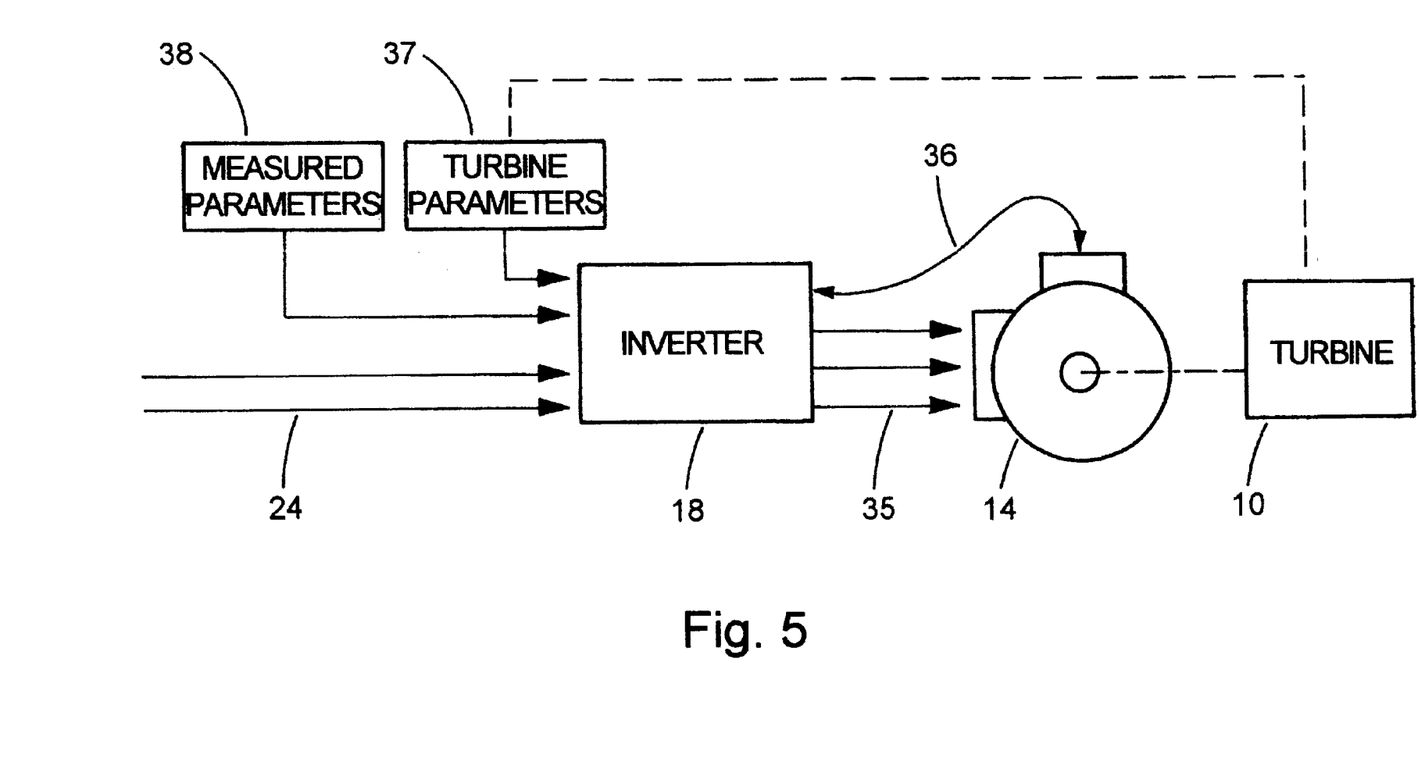
FIG. 5 is a more detailed block diagram of another part of the starting device in accordance with the invention.

As shown at 35 in FIG. 5, the inverter 18 has to supply the drive electric motor 14 with the three-phase alternating current voltage needed to power it during starting of the turbine 10, with sufficient current to provide the required torque, and it is therefore rated accordingly.

Thus, in accordance with the invention, the inverter 18 supplies to the drive electric motor 14 approximately 20 kVA at a maximal phase-neutral peak voltage in the order of 260 V.

As shown at 36 in FIG. 5, the inverter 18 also controls the drive electric motor 14.

The inverter 18 is itself preferably controlled using the vector control technique.

Since this technique is well known in itself, it will not be described here.

The starting device 12 in accordance with the invention preferably assures, independently of or in association with this vector control, control of the phase shift between the current supplied by the inverter 18 to the drive electric motor 14 and the electromotive force generated by the motor.

In practice the phase shift is controlled in accordance with the operating point of the drive electric motor 14 resulting, for example, from its instantaneous speed and/or torque characteristics.

For a given voltage, the resulting phase shift control advantageously provides a greater increase in speed without increasing the voltage, by extrapolating the possibilities normally offered by the voltage.

As shown at 37 in FIG. 5, for example, the inverter 18, to be more precise the phase and/or the amplitude of its output current and therefore the motor torque supplied, are controlled in accordance with parameters measured directly on the turbine 10 and in particular in accordance with the temperature of the turbine exhaust gases.

As shown at 38 in FIG. 5, the inverter 18 is instead or additionally controlled in accordance with preprogrammed parameters, for example the flight phase or the temperature.

Figure 6:
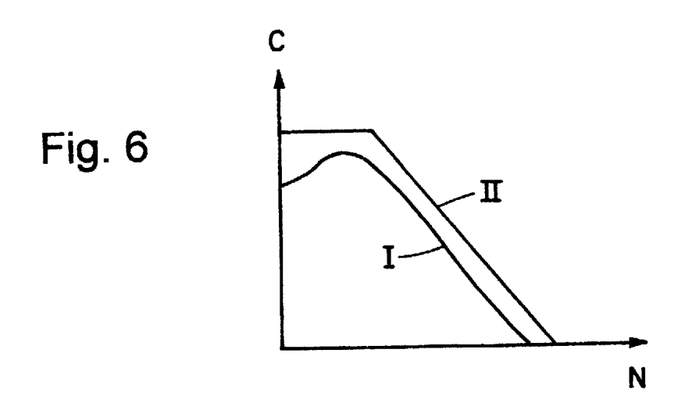
FIGS. 6, 7 and 8 are diagrams illustrating various intervention facilities of the starting device.
Figure 7:
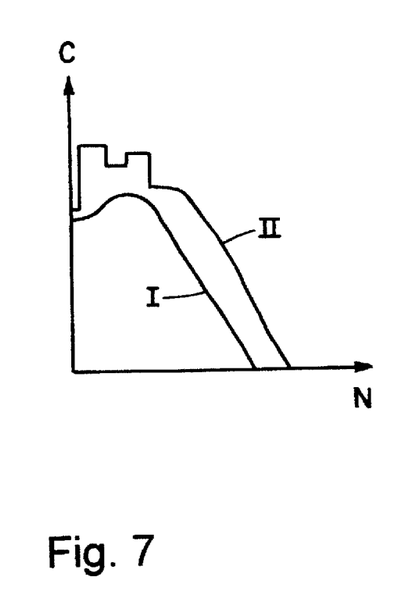
Figure 8:
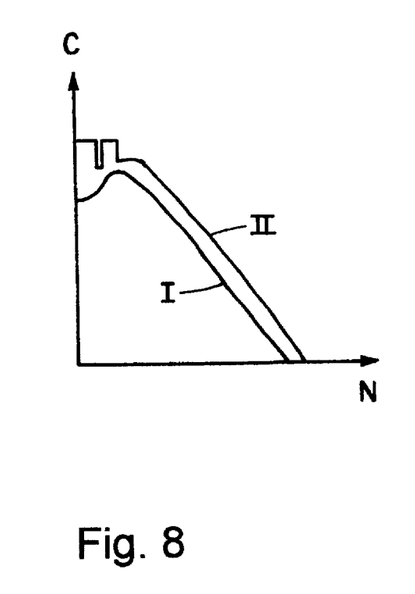

The flexibility that is therefore an advantage of the inverter 18 used in accordance with the invention is clearly shown in the diagrams of FIGS. 6 through 8.

In these diagrams the rotation speed N is plotted on the horizontal axis and the torque C on the vertical axis.

In each case the curve I represents the resisting torque of the turbine 10 and the curve II represents the drive torque of the drive electric motor 14, the difference representing the corresponding acceleration torque.

Normally, since the resisting torque of the turbine 10 varys relatively little at the start of the run up to speed, the corresponding drive torque of the drive electric motor 14 can be substantially constant (FIG. 6).

However, in accordance with the invention it can be modulated to a greater or lesser degree, as required (FIGS. 7 and 8).

Vector control of the inverter 18 means that the inverter 18 can be switched to a significantly lower switching frequency, for example in the order of 20 kHz, than that used in accordance with the more usual pulse width modulation technology.

For a given switching frequency this produces waveforms of better quality which facilitates the processing of the waveforms and their compatibility with all of the equipments concerned. It also provides a greater bandwidth and therefore widens the range of operating speeds of the drive electric motor 14.

Furthermore, for the same waveform quality, losses and constraints on the power switching devices are advantageously low.

Finally, it is advantageously well suited to concomitantly controlling the phase shift between the current supplied to the drive electric motor 14 and the electromotive force generated by the motor.

Associated with vector control of the inverter 18, such phase shift control optimizes the performance of the drive electric motor 14 so that its rating can be reduced or, for the same rating, its voltage/speed operating range can be increased.

The system constituted in accordance with the invention by the drive electric electrical starter motor whose output shaft is mechanically coupled to the input shaft of the turbine located in the rear or tail of the aircraft 14 and the inverter 18 is advantageously similar to a self-regulated synchronous motor in that, depending on the position of the rotor of the drive electric motor 14, the inverter 18 operates on that position by means of the current that it supplies to the motor.

In other words, in the starting device 12 in accordance with the invention, the control voltage of the drive electric motor 14 for starting the turbine 10 advantageously depends on its operating point.

If required, a saving can advantageously be achieved in terms of the batteries 20 because of the facility of using the onboard three-phase alternating current supply 22 of the aircraft 11 when the onboard three-phase alternating current supply 22 is operating.

Of course, the present invention is not limited to the embodiment described and shown, but encompasses any variant execution thereof.

In particular, instead of or in addition to the storage batteries, the electrical power supply can include the onboard direct current supply, (usually 28 V) i.e. the supply powering various onboard equipment and in particular the flight controls and which is obtained from the three-phase alternating current supply or, if necessary, from the storage batteries themselves.

Furthermore, the inverter can be of the soft switching type instead of the forced switching type.

What is claimed is:

1. A gas turbine engine starting device adapted to be used in an aircraft having a front end compartment and a rearward end compartment opposite said front end compartment, said gas turbine starting device comprising:

electrical power supply means located in said front end compartment of said aircraft for delivering a direct current source of power, said electrical power supply means comprising at least one storage battery and a voltage converter complementary therewith;

a gas turbine engine located in said rearward end compartment of said aircraft, said gas turbine engine having an input shaft;

a three-phase alternating current synchronous electric drive motor mounted adjacent said gas turbine engine, said electric drive motor having an output shaft mechanically coupled to said input shaft of said turbine engine for rotation therewith; and means for transmitting said electrical power supply means in said front end compartment to said electric drive motor located in said rearward end compartment of said aircraft, said means for transmitting comprising means for supplying alternating current (AC) to said electric drive motor, said means for supplying being electrically connected to said electric drive motor whereby power supplied by said electrical power supply means in said front end compartment of said aircraft is transmitted to said rearward end compartment to power said electric drive motor such that said electric drive motor drives said gas turbine engine to be started;

such that said gas turbine is started with power supplied from said at least one storage battery located in said front end compartment of said aircraft and does not require additional power supplied from said rearward end compartment of said aircraft.

2. The starting device as claimed in claim 1 wherein said voltage converter is formed of a plurality of converter modules having inputs connected in parallel and outputs connected in series.

3. The starting device as claimed in claim 2 wherein each converter module comprises a transformer which has an operating frequency in the range 25 kHz to 100 kHz.

4. The starting device as claimed in claim 3 wherein said transformer of said converter modules is a planar transformer.

5. The starting device as claimed in claim 2 wherein each converter module of said plurality of converter modules uses MOSFET type power switching devices.

6. The starting device as claimed in claim 2 wherein said plurality of converter modules are divided into groups and each said group includes one storage battery.

7. The starting device as claimed in claim 3 further comprising a current-sensitive control module and wherein said voltage converter is controlled by said current-sensitive control module.

8. The starting device as claimed in claim 7 wherein said control module is sensitive to a peak value of a current flowing in the secondary of said transformer of a respective converter module.

9. The starting device as claimed in claim 1 wherein said voltage converter derives a high voltage in the range 400 V to 600 V from a low voltage below 80 V.

10. The starting device as claimed in claim 1 further comprising an output filter and wherein said voltage converter is associated with said output filter.

11. The starting device as claimed in claim 10 wherein the energy source of said electrical power supply means includes an onboard three-phase alternating current supply and a current converter complementary therewith.

12. The starting device as claimed in claim 11 wherein said output filter associated with said voltage converter is also associated with said current converter.

13. The starting device as claimed in claim 1 further comprising a current-sensitive control module and wherein said voltage converter is controlled by said current-sensitive control module.

14. The starting device as claimed in claim 1 wherein said at least one storage battery and the corresponding voltage converter are disposed in said front end compartment of said aircraft.

15. The starting device as claimed in claim 1 wherein the energy source of said electrical power supply means includes an onboard direct current supply instead of or in addition to said at least one storage battery.

16. The starting device as claimed in claim 1 wherein the energy source of said electrical power supply means includes an onboard three-phase alternating current supply and a current converter complementary therewith.

17. The starting device as claimed in claim 16 wherein said current converter is in said front end compartment of said aircraft.

18. The starting device as claimed in claim 1 wherein said voltage converter is a three-phase high-voltage inverter.

19. The starting device as claimed in claim 18 wherein said inverter is a forced switching inverter.

20. The starting device as claimed in claim 1 wherein said inverter delivers approximately 20 kVA.

21. The starting device as claimed in claim 1 wherein said inverter uses IGBT type power switching devices.

22. The starting device as claimed in claim 1 wherein said inverter is controlled in accordance with the vector control technique.

23. The starting device as claimed in claim 1 adapted to control a phase shift between the current supplied by said inverter to said electric device motor and the electromotive force generated by said motor.

24. The starting device as claimed in claim 23 wherein said phase shift between said current supplied by said inverter to said electric device motor and said electromotive force generated by said motor is controlled in accordance with the operating point of said electric drive motor.

25. The starting device as claimed in claim 1 wherein said inverter is controlled in accordance with parameters measured on said gas turbine engine.

26. The starting device as claimed in claim 1 wherein said inverter is controlled in accordance with preprogrammed parameters.

27. The starting device as claimed in claim 1 wherein said electric drive motor is a permanent magnet synchronous motor.

28. The starting device as claimed in claim 1 wherein said gas turbine engine, said electric drive motor and said means for transmitting are disposed in said rearward end compartment of said aircraft.

* * * * *

UNITED STATES PATENT AND TRADEMARK OFFICE
CERTIFICATE OF CORRECTION

PATENT NO.    : 6,351,090 B1
DATED         : February 26, 2002
INVENTOR(S)   : Boyer et al.

It is certified that error appears in the above-identified patent and that said Letters Patent is hereby corrected as shown below:

<u>Title page,</u>
Item [74], delete "Vanophem & Vanophem", and insert -- VanOphem & VanOphem --.

<u>Column 1,</u>
Line 46, after "than", delete the comma ",".
Line 51, delete "motor.", and insert -- electrical motor starters, whose output shaft is mechanically coupled to the input shaft of the turbine located in the rear entail of the aircraft. --.

<u>Column 2,</u>
Line 21, delete "consists".
Line 58, delete "someone", and insert -- somewhat --.

<u>Column 3,</u>
Line 59, after "invention;", insert -- and --.
Line 67, after "in", delete the comma ",".

<u>Column 4,</u>
Line 3, after "itself", insert a comma -- , --.

<u>Column 5,</u>
Line 41, delete "frequence", and insert -- frequency --.
Line 60, after "in", delete the comma ",".

<u>Column 6,</u>
Line 24, after "advantageously", delete the comma ",".

UNITED STATES PATENT AND TRADEMARK OFFICE
CERTIFICATE OF CORRECTION

PATENT NO. : 6,351,090 B1
DATED : February 26, 2002
INVENTOR(S) : Boyer et al.

It is certified that error appears in the above-identified patent and that said Letters Patent is hereby corrected as shown below:

Column 7,
Line 54, delete "electrical starter motor whose output shaft is mechanically coupled to the input shaft of the turbine located in the rear or tail of the aircraft".

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,351,090 B1
DATED : February 26, 2002
INVENTOR(S) : Boyer et al.

It is certified that error appears in the above-identified patent and that said Letters Patent is hereby corrected as shown below:

Column 1,
Line 51, kindly delete "motor.", and insert -- electrical motor starters, whose output shaft is mechanically coupled to the input shaft of the turbine located in the rear entail of the aircraft. --.

Column 2,
Line 58, kindly delete "someone", and insert -- somewhat --.

Signed and Sealed this

Nineteenth Day of August, 2003

JAMES E. ROGAN
*Director of the United States Patent and Trademark Office*